(12) United States Patent
Mizoguchi

(10) Patent No.: US 9,223,130 B2
(45) Date of Patent: Dec. 29, 2015

(54) LIGHT SCANNER, IMAGE DISPLAY DEVICE, HEAD-MOUNTED DISPLAY, AND METHOD OF MANUFACTURING LIGHT SCANNER

(71) Applicant: Seiko Epson Corporation, Tokyo (JP)

(72) Inventor: Yasushi Mizoguchi, Suwa (JP)

(73) Assignee: Seiko Epson Corporation (JP)

( * ) Notice: Subject to any disclaimer, the term of this patent is extended or adjusted under 35 U.S.C. 154(b) by 140 days.

(21) Appl. No.: 14/170,949

(22) Filed: Feb. 3, 2014

(65) Prior Publication Data
US 2014/0218780 A1    Aug. 7, 2014

(30) Foreign Application Priority Data

Feb. 5, 2013   (JP) ................. 2013-020165

(51) Int. Cl.
  *G02B 26/08*  (2006.01)
  *G02B 26/10*  (2006.01)
  *G02B 27/10*  (2006.01)

(52) U.S. Cl.
  CPC ............ *G02B 26/085* (2013.01); *G02B 26/101* (2013.01); *G02B 27/1053* (2013.01)

(58) Field of Classification Search
  CPC ............ G02B 26/101; G02B 26/0833; G02B 26/0841; G02B 26/085; G02B 26/0858; G02B 26/105; G02B 27/0172; G02B 27/1053
  USPC ................................ 359/196.1–226.2; 216/24
  See application file for complete search history.

(56) References Cited

U.S. PATENT DOCUMENTS 8,432,595 B2    4/2013  Maeda
2009/0213447 A1*  8/2009  Hayashi ................. 359/216.1

FOREIGN PATENT DOCUMENTS

JP    2002-244059 A    8/2002
JP    2011-154344 A    8/2011
JP         4935607 B2    5/2012

* cited by examiner

*Primary Examiner* — James Phan
(74) *Attorney, Agent, or Firm* — Harness, Dickey & Pierce, P.L.C.

(57) ABSTRACT

A light scanner includes: a base part; a shaft part that swingably supports the base part around a first axis; an optical unit including a light transmission part that is supported by the base part and has light transmissivity, and a first light reflection reduction part that is provided on the light transmission part and reduces light reflection, wherein light enters the first light reflection reduction part.

15 Claims, 14 Drawing Sheets

LIGHT SCANNER, IMAGE DISPLAY DEVICE, HEAD-MOUNTED DISPLAY, AND METHOD OF MANUFACTURING LIGHT SCANNER

BACKGROUND

1. Technical Field

The present invention relates to a light scanner, an image display device, a head-mounted display, and a method of manufacturing the light scanner.

2. Related Art

For example, as an image display device for displaying an image on a screen, a configuration having a light source and a light scanner for two-dimensional scanning with light from the light source has been known (for example, see Patent Document 1 (JP-A-2011-154344)). The image display device disclosed in Patent Document 1 has three laser sources, a combining unit that combines laser beams from the three laser sources, and a light scanner that performs two-dimensional scanning with a laser beam combined by the combining unit. Here, intensity of the laser beams output from the laser source is high and almost all of the laser beams are reflected by the light scanner, and accordingly, there has been a problem that an image displayed on a screen is too bright and high contrast is not obtained. Note that there is a limit on reduction of output of the laser source (laser beam intensity) and, if the output is reduced to the minimum, it is difficult to make the contrast sufficiently higher.

SUMMARY

An advantage of some aspects of the invention is to provide a light scanner, an image display device, a head-mounted display, and a method of manufacturing the light scanner by which brightness of reflection light may be reduced and contrast of an image drawn by scanning of the reflection light may be may be improved.

The aspects of the invention are achieved by the following application examples.

An application example is directed to a light scanner including a base part, a shaft part that swingably supports the base part around a first axis, an optical unit including a light transmission part that is supported by the base part and has light transmissivity, and a first light reflection reduction part that is provided on the light transmission part and reduces light reflection, wherein light enters the first light reflection reduction part.

With this configuration, the light scanner that may reduce brightness of the reflection light and improve contrast of an image drawn by scanning of the reflection light is obtained.

In the light scanner of the application example, it is preferable that light reflectance of the optical unit is less than 4%.

With this configuration, the light scanner that may display an image with the higher contrast is obtained.

In the light scanner of the application example, it is preferable that light transmittance of the optical unit is 92% or more.

With this configuration, when the light is transmitted through the light transmission part, an amount of light absorbed by the light transmission part may be suppressed and heat generation (temperature rise) of the light transmission part may be suppressed. The heat generation of the light transmission part is suppressed, and thereby, thermal strain of the light scanner may be suppressed and light scanning characteristics of the light scanner may be maintained.

In the light scanner of the application example, it is preferable that a second light reflection reduction part that reduces reflectance of the light transmitted through the first light reflection reduction part and the light transmission part is provided at an opposite side of the light transmission part to a surface on which the first light reflection reduction part is provided.

With this configuration, stray light may be suppressed.

In the light scanner of the application example, it is preferable that the optical unit is provided on a surface at the opposite side of the light transmission part to the surface on which the first light reflection reduction part is provided, and includes a third light reflection reduction part that reduces light reflection.

With this configuration, stray light may be suppressed.

In the light scanner of the application example, it is preferable that the base part has a through hole, and at least part of the light transmitted through the optical unit passes through the through hole.

With this configuration, heat generation of the base part due to irradiation of the base part with the light transmitted through the light transmission part may be suppressed. The heat generation of the base part is suppressed, and thereby, thermal strain of the light scanner may be suppressed and light scanning characteristics of the light scanner may be maintained.

In the light scanner of the application example, it is preferable that the light transmission part is provided to cover an opening at one side of the through hole.

With this configuration, the configuration of the light scanner may be simpler.

In the light scanner of the application example, it is preferable that the light transmission part is provided within the through hole.

With this configuration, downsizing of the light scanner may be realized.

In the light scanner of the application example, it is preferable that a step portion is formed in the middle of the through hole in an axial direction, and the light transmission part is in contact with the step portion.

With this configuration, placement of a light reflection layer may be accurately controlled.

In the light scanner of the application example, it is preferable that the light transmission part is provided to be apart from the shaft part in a thickness direction of the first light reflection reduction part and overlap with at least a part of the shaft part as seen from the thickness direction.

With this configuration, even when the area of the plate surface of the light transmission layer is made larger, downsizing of the light scanner may be realized.

Another application example is directed to an image display device including a movable part that can swing around a first axis, and a shaft part that swingably supports the movable part around the first axis, and the movable part includes a base part connected to the shaft part, a light transmission part that is supported by the base part and has light transmissivity, and a first light reflection reduction part that is provided on the light transmission part and reduces light reflection.

With this configuration, the image display device that may display an image with the higher contrast is obtained.

Still another application example is directed to a head-mounted display including a frame worn on a head of an observer, and a light scanner provided in the frame, and the light scanner includes a base part, a shaft part that swingably supports the base part around a first axis, an optical unit including a light transmission part that is supported by the base part and has light transmissivity, and a first light reflection reduction part that is provided on the light transmission part and reduces light reflection, wherein light enters the first light reflection reduction part.

With this configuration, the head-mounted display that may display an image with the higher contrast is obtained.

Yet another application example is directed to a method of manufacturing a light scanner including: bonding substrates by preparing a substrate having a plate-like base part and a projection part projecting to one surface side of the base part and a transparent substrate with a convex portion formed on one surface side, superposing the substrate and the transparent substrate, and bonding the projection part and the convex portion, patterning the base part and forming the base part that supports the projection part and a shaft part connected to the base part, thinning the transparent substrate while leaving the convex portion to form a light transmission part, and forming a light reflection reduction part that reduces light reflection in the light transmission part.

With this configuration, the light scanner that may reduce brightness of the reflection light and improve contrast of an image drawn by scanning of the reflection light may be accurately manufactured.

In the method of manufacturing the light scanner of the application example, it is preferable that the method further includes filling a gap between the substrate and the transparent substrate with a sealing material prior to the thinning of the transparent substrate is provided, and thinning of the transparent substrate is performed by wet etching at the thinning of the transparent substrate.

With this configuration, thinning of the transparent substrate may be accurately performed while damage on the substrate by etchant may be prevented.

Still yet another application example is directed to a light scanner including a base part, a shaft part that swingably supports the base part around a first axis, and an optical unit including a first optical part that is supported by the base part and has light transmissivity, and a second optical part that is provided on the first optical part and has higher light transmittance than the light transmittance of the first optical part, wherein light enters the second optical part.

With this configuration, the light scanner that may reduce brightness of the reflection light and improve contrast of an image drawn by scanning of the reflection light is obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, embodiments of a light scanner, an image display device, a head-mounted display, and a method of manufacturing the light scanner will be explained with reference to the accompanying drawings.

1. Image Display Device

First Embodiment

Figure 1:
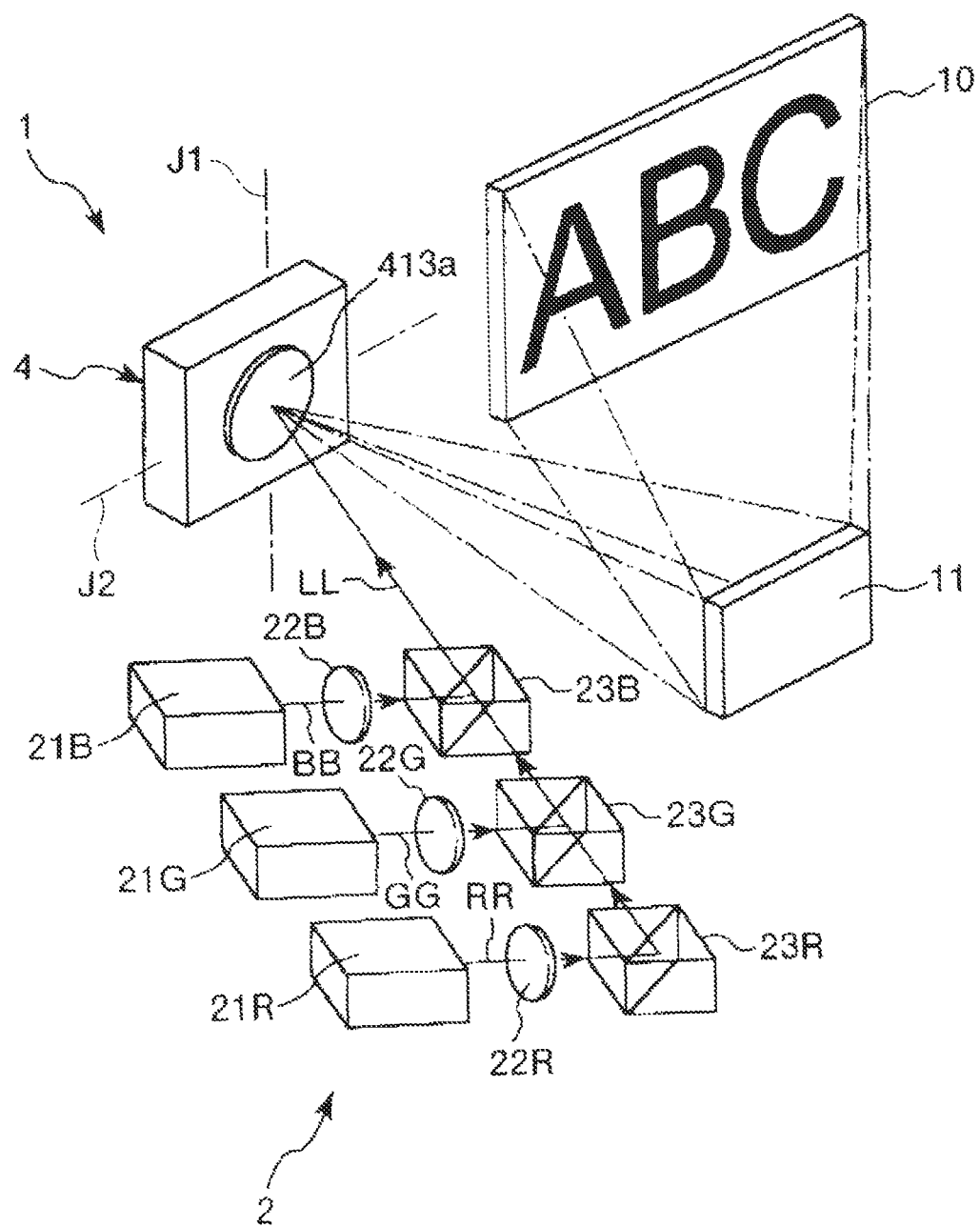
FIG. 1 is a schematic configuration diagram showing a first embodiment of an image display device according to the invention.
Figure 2:
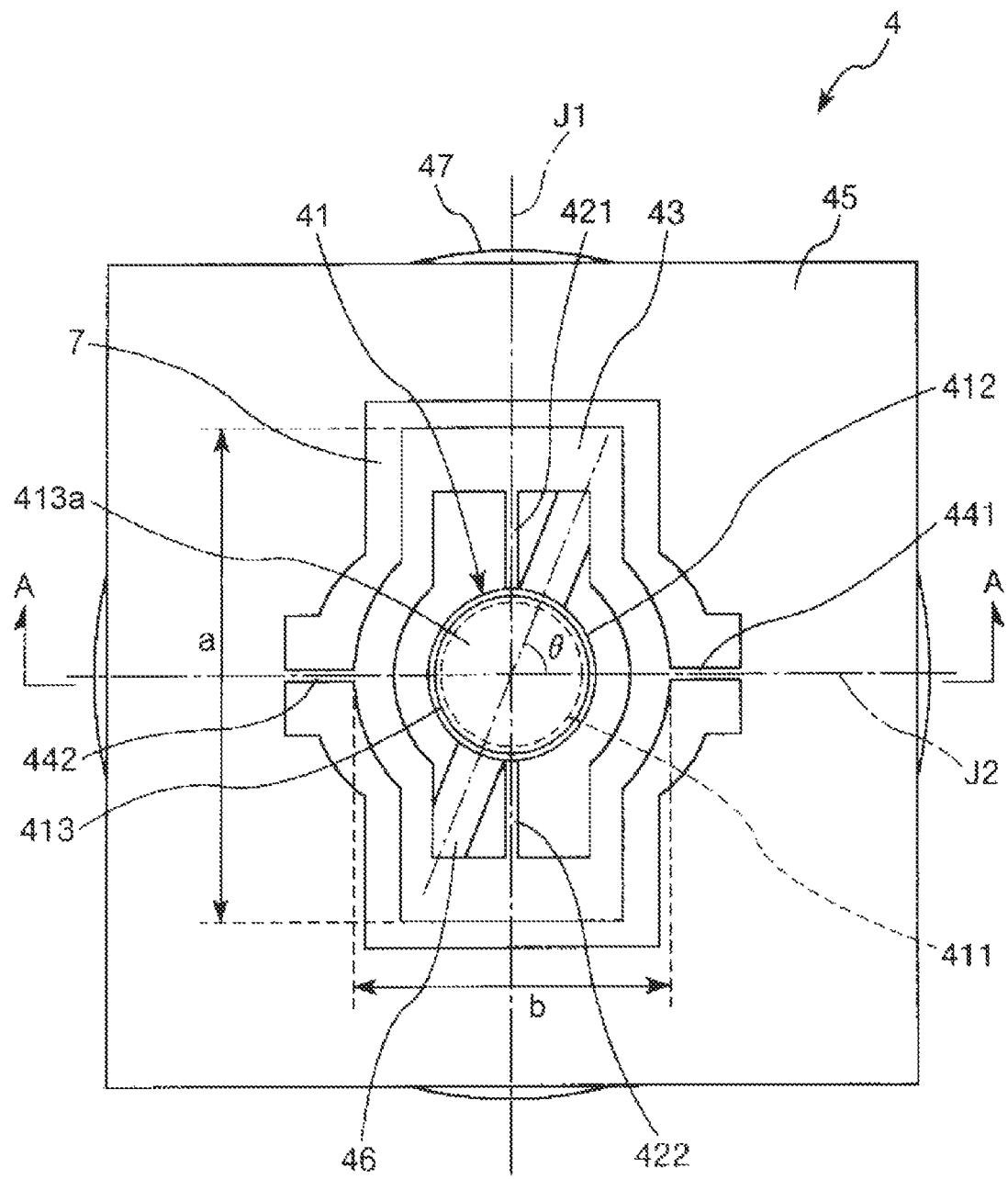
FIG. 2 is a top view of a light scanner of the image display device shown in FIG. 1.
Figure 3:
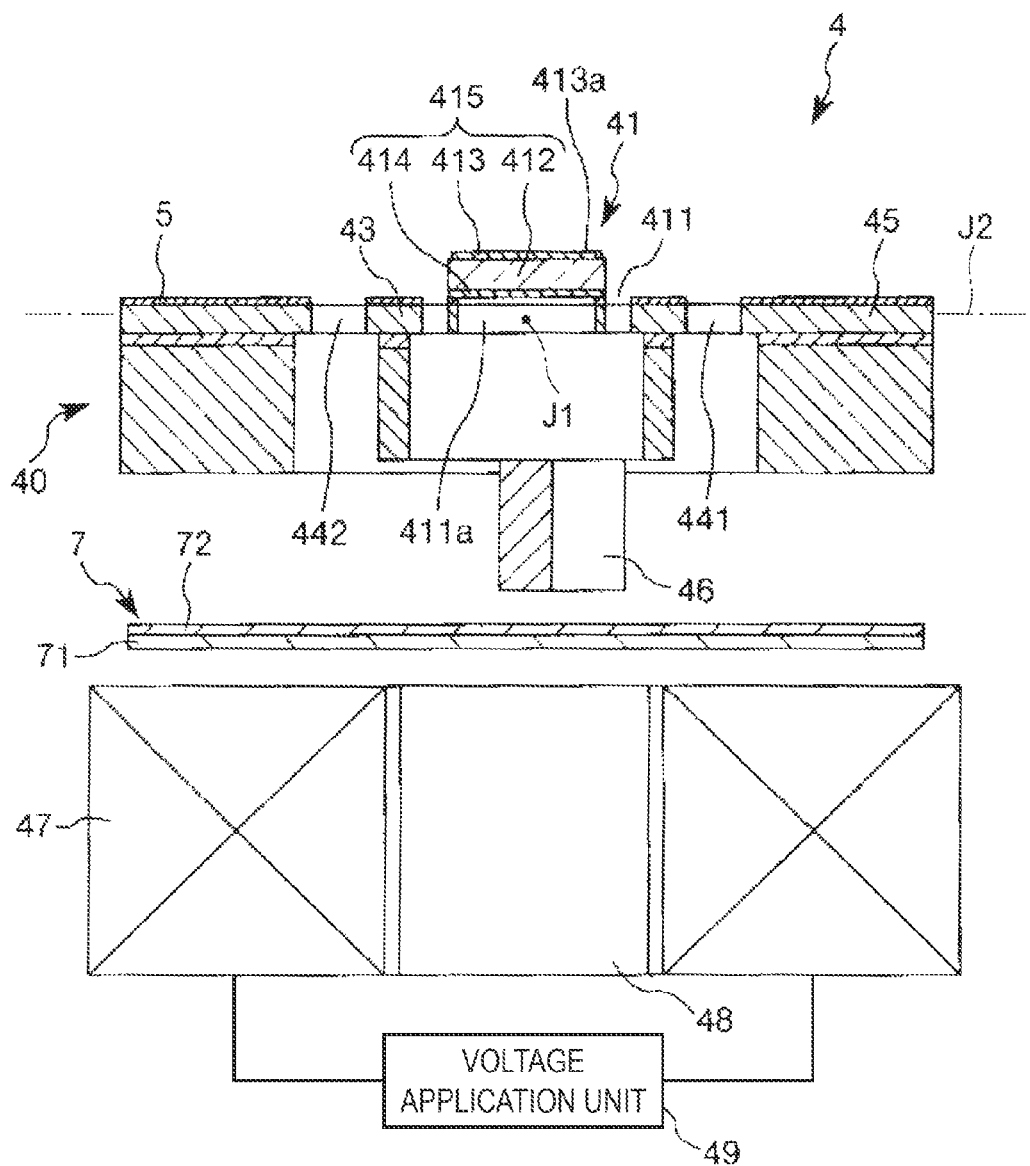
FIG. 3 is a sectional view along A-A line in FIG. 2.
Figure 4:
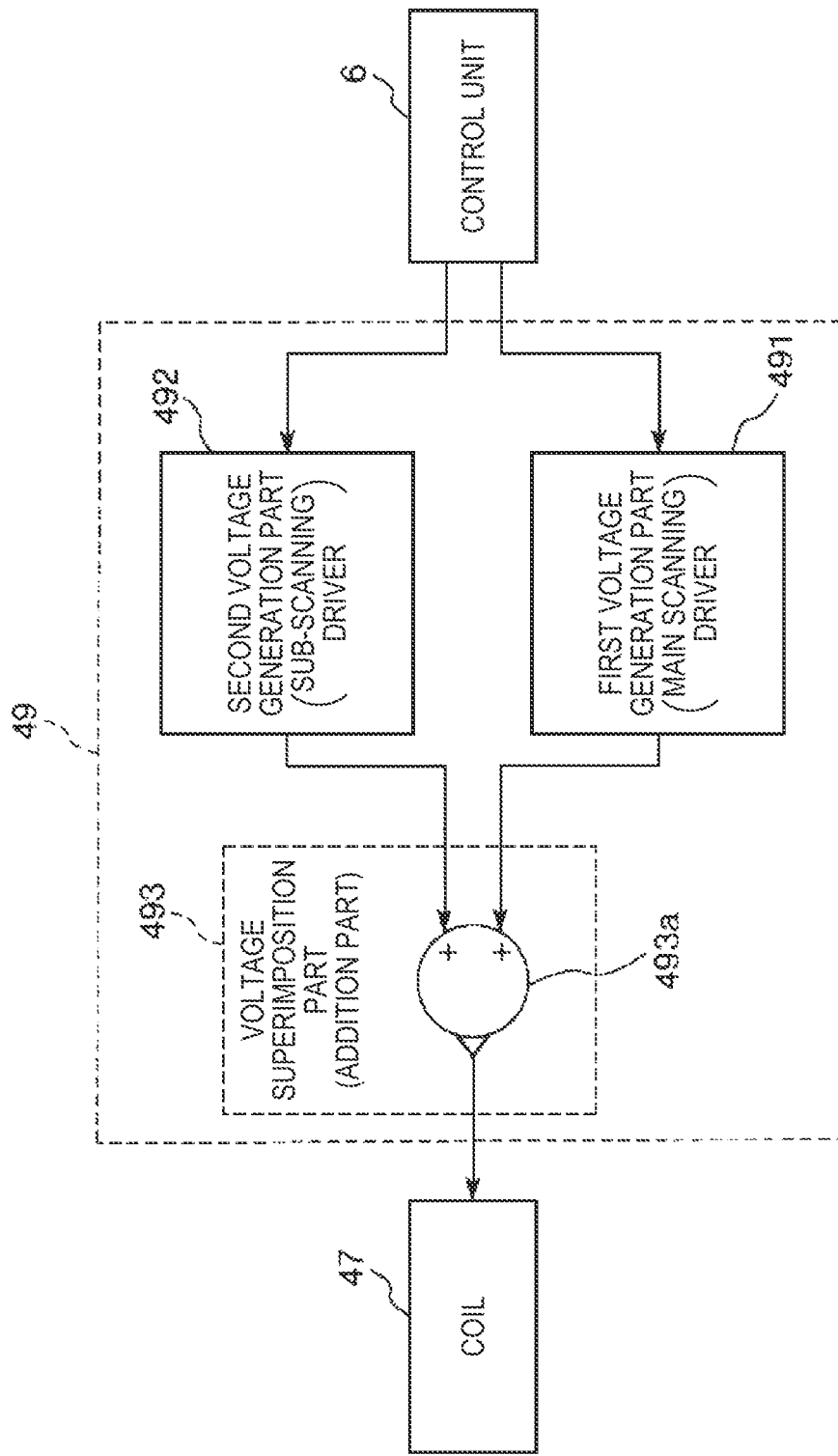
FIG. 4 is a block diagram of a voltage applying unit of the light scanner shown in FIG. 2.
Figure 5A:
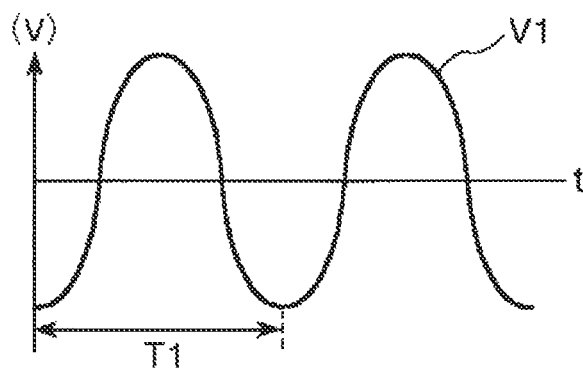
FIGS. 5A and 5B show examples of generated voltages in a first voltage generation unit and a second voltage generation unit shown in FIG. 4.
Figure 5B:
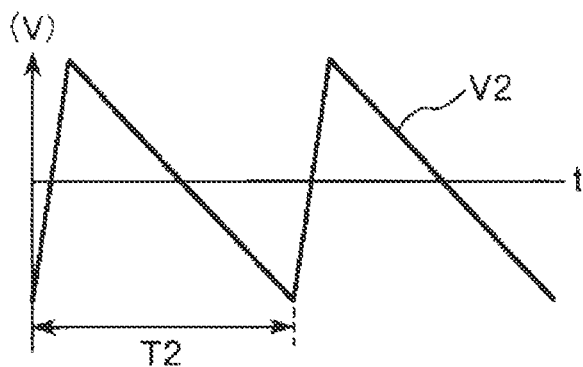

FIG. 1 is a schematic configuration diagram showing the first embodiment of an image display device according to the invention, FIG. 2 is a top view of a light scanner of the image display device shown in FIG. 1, FIG. 3 is a sectional view along A-A line in FIG. 2, FIG. 4 is a block diagram of a voltage applying unit of the light scanner shown in FIG. 2, and FIGS. 5A and 5B show examples of generated voltages in a first voltage generation unit and a second voltage generation unit shown in FIG. 4. Note that, as below, for convenience of explanation, the upside in FIG. 3 is referred to as "upper" and the downside is referred to as "lower".

An image display device 1 shown in FIG. 1 is a device that display an image by two-dimensional scanning of an object 10 such as a screen or a wall surface with a drawing laser beam LL.

As shown in FIGS. 1 and 4, the image display device 1 has a drawing light source unit 2 that outputs the drawing laser beam LL, a light scanner (light scanner according to the invention) 4 that performs scanning with the drawing laser beam LL, a mirror 11 that reflects the drawing laser beam LL for scanning by the light scanner 4, and a control unit 6 that controls operations of the drawing light source unit 2 and the light scanner 4. Note that the mirror 11 is provided as necessary and may be omitted.

Drawing Light Source Unit

As shown in FIG. 1, the drawing light source unit 2 includes laser sources (light source parts) 21R, 21G, 21B of respective colors of red, green, blue, and collimator lenses 22R, 22G, 22B and dichroic mirrors 23R, 23G, 23B provided in correspondence with the laser sources 21R, 21G, 21B.

The laser sources 21R, 21G, 21B each has a light source and a drive circuit (not shown). Further, the laser source 21R outputs a red laser beam RR, the laser source 21G outputs a green laser beam GG, and the laser source 21B outputs a blue laser beam BB. The laser beams RR, GG, BB are respectively output in response to drive signals transmitted from the control unit 6 and parallelized or nearly parallelized by the collimator lenses 22R, 22G, 22B. As the laser source parts 21R, 21G, 21B, for example, semiconductor lasers such as edge-emitting lasers or surface-emitting lasers may be used. Using the semiconductor lasers, downsizing of the laser source parts 21R, 21G, 21B may be realized.

According to the arrangement of the laser source parts 21R, 21G, 21B, the dichroic mirror 23R, the dichroic mirror 23B, and the dichroic mirror 23G are provided. The dichroic mirror 23R has a property of reflecting the laser beam RR. The dichroic mirror 23B has a property of reflecting the laser beam BB and transmitting the laser beam RR. The dichroic mirror 23G has a property of reflecting the laser beam GG and transmitting the laser beams RR and BB. The laser beams RR, GG, BB of the respective colors are combined by these dichroic mirrors 23R, 23G, 23B into the drawing laser beam LL.

Light Scanner

The light scanner 4 has a function of two-dimensional scanning with the drawing laser beam LL from the drawing light source unit 2. As shown in FIGS. 2 and 3, the light scanner 4 has a structure 40, a permanent magnet 46, a coil 47, a magnetic core 48, and a voltage application unit 49. Further, the structure 40 has a movable part 41, a pair of first shaft parts 421, 422, a frame body part 43, a pair of second shaft parts 441, 442, and a support part 45.

Of them, the movable part 41 and the first shaft parts 421, 422 form a first vibration system that swings (reciprocates) around the first shaft parts 421, 422 as a first axis J1. Further, the movable part 41, the first shaft parts 421, 422, the frame body part 43, the second shaft parts 441, 442, and the permanent magnet 46 form a second vibration system that swings (reciprocates) around a second axis J2. Furthermore, the permanent magnet 46, the coil 47, the magnetic core 48, and the voltage application unit 49 form a driving unit that drives the above described first vibration system and the second vibration system.

The movable part 41 has a base part 411, a light transmission part 412 provided on the base part 411, and a first light reflection reduction part 413 provided on the light transmission part 412. The drawing laser beam LL enters the movable part 41 and part of the entering drawing laser beam LL is reflected by the surface of the first light reflection reduction part 413 (light reflection surface 413a), and the other lights are transmitted (pass) through the light transmission part 412 and the base part 411 or absorbed by the light transmission part 412.

The base part 411 has an annular shape and a through hole 411a is formed at the center. The base part 411 has a function of supporting the light transmission part 412. The through hole 411a is a hole through which the drawing laser beam LL that has been transmitted through the light transmission part 412 passes. It is preferable that the through hole 411a is as large as possible within a range in which the mechanical strength of the base part 411 can be maintained. In other words, it is preferable to thin the base part 411 as thin as possible in a range in which the mechanical strength of the base part 411 can be maintained. The through hole 411a is provided, and thereby, heat generation of the base part 411 due to irradiation of the base part 411 with the drawing laser beam LL transmitted through the light transmission part 412 may be suppressed. The heat generation of the base part 411 is suppressed, and thereby, thermal strain of the light scanner 4 may be suppressed and light scanning characteristics of the light scanner 4 may be maintained.

Note that the configuration of the base part 411 is not limited to that of the embodiment, but a part of the base part 411 may be lost. That is, the through hole 411a may open to a part of the side surface of the base part 411. Thereby, the area of the upper surface of the base part 411 may be made smaller, and the reflection of the drawing laser beam LL on the upper surface of the base part 411 may be suppressed more effectively.

At the upper surface side of the base part 411 (the side that the drawing laser beam LL enters), the light transmission part (first optical part) 412 is provided to cover the upper opening of the through hole 411a. The light transmission part 412 is placed as described above, and thereby, the configuration of the light scanner 4 becomes simpler. The light transmission part 412 has a plate-like shape, and the upper surface thereof is formed by a flat surface. The light transmission part 412 has high light transmissivity for the drawing laser beam LL.

Further, the first light reflection reduction part 413 (second optical part) that reduces light reflection is provided on the upper surface of the light transmission part 412, and a third light reflection reduction part 414 that reduces light reflection is provided on the lower surface. Thereby, only a slight amount of the drawing laser beam LL output from the drawing light source unit 2 is reflected and the brightness of the image displayed on the object 10 is suppressed. Further, the image with the higher contrast by the amount of suppressed brightness may be displayed.

Particularly, by providing the third light reflection reduction part 414, the better image display characteristics are obtained. Specifically, the lower surface of the light transmission part 412 is close and in parallel to the light reflection surface 413a, and thereby, the drawing laser beam LL reflected by the lower surface of the light transmission part 412 and the drawing laser beam LL reflected by the light reflection surface 413a are slightly misaligned in optical axis and in parallel to each other. Accordingly, if the drawing laser beam LL is reflected by the lower surface of the light transmission part 412, the original image drawn by the drawing laser beam LL reflected by the light reflection surface 413a and the image drawn by the drawing laser beam LL reflected by the lower surface of the light transmission part 412 are superimposed with misalignment and displayed (the so-called ghost occurs), and deterioration of image quality including blur in outline may be caused. Accordingly, the third light reflection reduction part 414 is provided on the lower surface of the light transmission part 412 to suppress occurrence of ghost, and thereby, the better image display characteristics is obtained.

The higher the light transmittance of an optical unit 415 including the light transmission part 412, the first light reflection reduction part 413, and the third light reflection reduction part 414 (transmittance of drawing laser beam LL), the better. Specifically, the transmittance is preferably 92% or more and more preferably 99% or more. Thereby, when the drawing laser beam LL is transmitted through the optical unit 415, the amount of the drawing laser beam LL absorbed by the optical unit 415 may be suppressed and heat generation (temperature rise) of the optical unit 415 may be suppressed. The heat generation of the optical unit 415 is suppressed, and thereby, thermal strain of the light scanner 4 may be suppressed and light scanning characteristics of the light scanner 4 may be maintained. Further, the light transmittance of the first light reflection reduction part 413 is set to be higher than the light transmittance of the light transmission part 412. Thereby, only a slight amount of the drawing laser beam LL output from the drawing light source unit 2 is reflected by the light reflection surface 413a and the brightness of the image displayed on the object 10 is suppressed. Further, the image with the higher contrast by the amount of suppressed brightness may be displayed.

Furthermore, the lower the light reflectance of the optical unit 415 (reflectance of the drawing laser beam LL), the better, unless the reflectance is 0%. Specifically, the reflectance is preferably less than 4% and more preferably less than 1%. Thereby, only a slight amount of the drawing laser beam LL output from the drawing light source unit 2 is reflected by the light reflection surface 413a and the brightness of the image displayed on the object 10 is suppressed. Further, the image with the higher contrast by the amount of suppressed brightness may be displayed.

Here, the light transmittance and the light reflectance of the optical unit 415 may have wavelength dependence depending on the materials of the light transmission part 412 and the first and third light reflection reduction part 413, 414. In this case, it is preferable that the light reflectance is 92% or more and the light transmittance is less than 4% in all lights of laser beams RR, GG, BB, however, the light reflectance may be 92% or more and the light transmittance may be less than 4% in at least one light of laser beams RR, GG, BB.

The constituent material of the light transmission part 412 is not particularly limited as long as it has high light transmittance for the drawing laser beam LL, however, a substantially colorless and transparent material is preferably used. The colorless and transparent material includes a glass material such as silica glass, Pyrex glass ("Pyrex" is a registered trademark), or TEMPAX glass, crystal, or the like, for example. Further, among them, the material having a coefficient of thermal expansion closer to the coefficient of thermal expansion of the constituent material of the base part 411 is preferably used.

The thickness of the light transmission part 412 is not particularly limited, however, it is preferable that the thickness is as thin as possible within a range in which the mechanical strength necessary for the light transmission part 412 can be maintained. Specifically, it is preferable that the thickness is about from 30 μm to 200 μm. Thereby, when the drawing laser beam LL passes through the light transmission part 412, the amount of the drawing laser beam LL absorbed by the light transmission part 412 may be suppressed and heat generation of the light transmission part 412 may be suppressed. The heat generation of the light transmission part 412 is suppressed, and thereby, thermal strain of the light scanner 4 may be suppressed and light scanning characteristics of the light scanner 4 may be maintained.

The first and third light reflection reduction parts 413, 414 are not particularly limited as long as they may reduce reflection and, for example, known various anti-reflection films (AR coatings) may be used. That is, the first light reflection reduction part 413 may be formed by a dielectric multilayer in which high-refractive-index layers and low-refractive-index layers are alternately stacked, for example. The material forming the high-refractive-index layer is not particularly limited as long as optical characteristics necessary for the first light reflection reduction part 413 may be obtained, but includes $Ti_2O$, $Ta_2O_5$, niobium oxide, or the like. On the other hand, the material forming the low-refractive-index layer is not particularly limited as long as optical characteristics necessary for the first light reflection reduction part 413 may be obtained, but includes $MgF_2$, $SiO_2$, or the like, for example.

As above, the movable part 41 has been explained. In the embodiment, the base part 411 and the light transmission part 412 respectively have circular shapes in a plan view, however, the shapes of the base part 411 and the light transmission part 412 in the plan view are not limited, but include polygonal shapes such as oval shapes, triangular shapes, or rectangular shapes, for example.

The frame body part 43 has a frame shape and is provided to surround the base part 411 of the movable part 41. In other words, the base part 411 of the movable part 41 is provided inside of the frame body part 43 having the frame shape. The base part 411 of the movable part 41 is supported by the frame body part 43 via the pair of first shaft parts 421, 422. Further, the frame body part 43 is supported by the support part 45 via the pair of second shaft parts 441, 442.

Furthermore, the length of the frame body part 43 in the direction along the first axis J1 is longer than the length in the direction along the second axis J2. That is, suppose that the length of the frame body part 43 in the direction along the first axis J1 is a and the length of the frame body part 43 in the direction along the second axis J2 is b, a relationship of a>b is satisfied. Thereby, the length of the light scanner 4 in the direction along the second axis J2 may be suppressed while the length necessary for the first shaft parts 421, 422 is secured.

In addition, the frame body part 43 has a shape along the outer shape of the structure including the base part 411 and the pair of first shaft parts 421, 422 in the plan view. Thereby, downsizing of the frame body part 43 may be realized while the vibration of the first vibration system including the movable part 41 and the pair of first shaft parts 421, 422, i.e., swing of the movable part 41 around the first axis J1 is allowed. Note that the shape of the frame body part 43 is not limited to that in the drawing as long as it is like a frame.

The first shaft parts 421, 422 and the second shaft parts 441, 442 are respectively elastically deformable. Further, the first shaft parts 421, 422 connect the movable part 41 and the frame body part 43 so that the movable part 41 may swing around the first axis J1. Further, the second shaft parts 441, 442 connect the frame body part 43 and the support part 45 so that the frame body part 43 may swing around the second axis J2 orthogonal to the first axis J1.

The first shaft parts 421, 422 are provided to face each other via the base part 411 of the movable part 41. Further, the first shaft parts 421, 422 respectively have longitudinal shapes extending in the direction of the first axis J1. The first shaft parts 421, 422 respectively have one ends connected to the base part 411 and the other ends connected to the frame body part 43. Furthermore, the first shaft parts 421, 422 are respectively provided so that their center axes may be aligned with the first axis J1. Those first shaft parts 421, 422 are respectively torsionally deformed with the swing of the movable part 41 around the first axis J1.

The second shaft parts 441, 442 are provided to face each other via the frame body part 43. Further, the second shaft parts 441, 442 respectively have longitudinal shapes extending in the direction of the second axis J2. The second shaft parts 441, 442 respectively have one ends connected to the frame body part 43 and the other ends connected to the support part 45. Furthermore, the second shaft parts 441, 442 are respectively provided so that their center axes may be aligned with the second axis J2. Those second shaft parts 441, 442 are respectively torsionally deformed with the swing of the frame body part 43 around the second axis J2.

As described above, the movable part 41 may be swung around the first axis J1 and the frame body part 43 may be swung around the second axis J2, and thereby, the movable part 41 (light reflection surface 413a) may be swung around the two axes of the first, second axes J1, J2 orthogonal to each other.

Note that the shapes of the first shaft parts 421, 422 and the second shaft parts 441, 442 are not limited to the above described shapes, but may have bent or curved parts and branched parts at least in one locations in the middle, for example. Further, the respective shaft parts 421, 422, 441, 442 may be divided into two shaft parts.

As above, the structure 40 has been explained. In the embodiment, an anti-reflection film (reflection reduction part) 5 is provided in a region located at the underside and the outside of the light reflection surface 413a of the structure 40, in other words, a region that may be irradiated with the drawing laser beam LL that has been transmitted through the light transmission part 412 and passed through the through hole 411a and the drawing laser beam LL applied around the light reflection surface 413a. Specifically, the anti-reflection film 5 is provided on the respective upper surfaces of the base part 411, the first shaft parts 421, 422, the frame body part 43, the second shaft parts 441, 442, and the support part 45, and further, on the lower surface of the light transmission part 412. The anti-reflection film 5 has a function of reducing the reflectance (preferably, to zero) of the drawing laser beam LL entering below and outside of the light reflection surface 413a of the structure 40. Thereby, unnecessary drawing laser beams LL may be prevented from becoming stray light and the better light scanning characteristics are obtained. Note that the anti-reflection film 5 may be further provided on inner and outer circumferential surfaces of the base part 411, inner and outer circumferential surfaces of the frame body part 43, and the inner circumferential surface of the support part 45, and the above described advantage is further improved in this case.

Note that, in place of the anti-reflection film 5, roughening, blackening, or the like may be performed. Thereby, the same advantage as that of the anti-reflection film 5 may be obtained.

Further, a second light reflection reduction part 7 supported by a base 71 is provided between the structure 40 and the coil 47 (at the opposite side to the surface of the light transmission part 412 on which the first light reflection reduction part 413 is provided. The second light reflection reduction part 7 has a function of reducing the reflectance (preferably, to zero) of the drawing laser beam LL transmitted through the optical unit 415. The second light reflection reduction part 7 is provided to face each of the movable part 41 (light transmission part 412), the gap between the base part 411 and the frame body part 43, and the gap between the frame body part 43 and the support part 45, and thereby, unnecessary drawing laser beams LL transmitted through the optical unit 415 and unnecessary drawing laser beams LL passing through the gaps may be prevented from becoming stray light and the better light scanning characteristics are obtained. The second light reflection reduction part 7 may have the same configuration as that of the above described first light reflection reduction part 413. Note that the second light reflection reduction part 7 may have a configuration in which roughening, blackening, or the like has been performed on the surface of the base 71 as long as the reflectance may be reduced.

The base part 411, the first shaft parts 421, 422, the frame body part 43, the second shaft parts 441, 442, and the support part 45 are integrally formed. In the embodiment, the base part 411, the first shaft parts 421, 422, the frame body part 43, the second shaft parts 441, 442, and the support part 45 are formed by etching of an SOI substrate in which a first Si layer (device layer), an $SiO_2$ layer (box layer), and a second Si layer (handle layer) are stacked in this order. Thereby, the vibration characteristics of the first vibration system and the second vibration system may be made better. Further, since micromachining can be performed on the SOI substrate by etching, the base part 411, the first shaft parts 421, 422, the frame body part 43, the second shaft parts 441, 442, and the support part 45 are formed using the SOI substrate, and thereby, the dimension accuracy of them may be made better and downsizing of the light scanner 4 may be realized.

The base part 411, the first shaft parts 421, 422, and the second shaft parts 441, 442 are respectively formed by the first Si layer of the SOI substrate. Thereby, the elasticity of the first shaft parts 421, 422 and the second shaft parts 441, 442 may be made better. Further, the base part 411 may be prevented from being in contact with the frame body part 43 when rotating around the first axis J1. Furthermore, the frame body part 43 and the support part 45 are respectively formed by a multilayered structure including the first Si layer, the $SiO_2$ layer, and the second Si layer of the SOI substrate. Thereby, the stiffness of the frame body part 43 and the support part 45 may be made better. In addition, the $SiO_2$ layer and the second Si layer of the frame body part 43 have not only a function as ribs of improving the stiffness of the frame body part 43 but also a function of preventing the movable part 41 from being in contact with the permanent magnet 46.

The permanent magnet 46 is bonded to the above described lower surface of the frame body part 43. The bonding method of the permanent magnet 46 and the frame body part 43 is not particularly limited, but a bonding method using an adhesive may be used, for example. The permanent magnet 46 is magnetized in a direction inclined with respect to the first, second axes J1, J2 in the plan view.

In the embodiment, the permanent magnet 46 has a longitudinal shape (bar shape) extending in the direction inclined with respect to the first, second axes J1, J2. Further, the permanent magnet 46 is magnetized in the longitudinal direction. That is, the permanent magnet 46 is magnetized so that one end may be an S-pole and the other end may be an N-pole. Furthermore, the permanent magnet 46 is provided to be symmetric with respect to an intersection between the first axis J1 and the second axis J2 as the center in the plan view.

The inclination angle $\theta$ of the magnetization direction (extension direction) of the permanent magnet 46 with respect to the second axis J2 is not particularly limited, but the angle is preferably from 30° to 60°, more preferably from 45° to 60°, and even more preferably equal to 45°. The permanent magnet 46 is provided as described above, and thereby, the movable part 41 (light reflection surface 413a) may be swung around the second axis J2 smoothly and reliably.

As the permanent magnet 46, for example, a neodymium magnet, a ferrite magnet, a samarium-cobalt magnet, an alnico magnet, a bonded magnet, or the like may be preferably used. The permanent magnet 46 is formed by polarization of a hard magnetic material and, for example, formed by setting a hard magnetic material before polarization in the frame body part 43, and then, polarizing it. This is because, if the permanent magnet 46 that has already been polarized is set in the frame body part 43, the permanent magnet 46 may not be set in a desired position due to magnetic effects of external and other components.

The coil 47 is provided immediately below the permanent magnet 46. Thereby, the magnetic field generated from the coil 47 may be allowed to efficiently act on the permanent magnet 46. Thereby, power saving and downsizing of the light scanner 4 may be realized. The coil 47 is provided to be wound around the magnetic core 48. Thereby, the magnetic field generated in the coil 47 may be allowed to efficiently act on the permanent magnet 46. Note that the magnetic core 48 is dispensable.

The coil 47 is electrically connected to the voltage application unit 49. Further, a voltage is applied to the coil 47 by the voltage application unit 49, and thereby, a magnetic field with magnetic flux orthogonal to the first, second axes J1, J2 is generated.

As shown in FIG. 4, the voltage application unit 49 includes a first voltage generation part 491 that generates a first voltage V1 for rotating the movable part 41 around the first axis J1, a second voltage generation part 492 that generates a second voltage V2 for rotating the movable part 41 around the second axis J2, and a voltage superimposition part 493 that superimposes the first voltage V1 and the second voltage V2, and applies the voltage superimposed by the voltage superimposition part 493 to the coil 47.

As shown in FIG. 5A, the first voltage generation part 491 generates the first voltage V1 (main scanning voltage) that periodically changes with a period T1. The first voltage V1 forms a waveform like sine wave. The frequency of the first voltage V1 (1/T1) is preferably from 10 to 40 kHz, for example. In the embodiment, the frequency of the first voltage V1 is set to be equal to the torsional resonance frequency (f1) of the first vibration system including the movable part 41 and the pair of first shaft parts 421, 422. Thereby, the rotation angle of the movable part 41 may be made larger around the first axis J1.

On the other hand, as shown in FIG. 5B, the second voltage generation part 492 generates the second voltage V2 (sub-scanning voltage) that periodically changes with a period T2 different from the period T1. The second voltage V2 forms a waveform like saw-tooth wave. The frequency of the second voltage V2 (1/T2) is preferably from 30 to 120 Hz (about 60 Hz), for example, as long as the frequency may be different from the frequency of the first voltage V1 (1/T1). In the embodiment, the frequency of the second voltage V2 is adjusted to be a frequency different from the torsional resonance frequency (resonance frequency) of the second vibration system including the movable part 41, the pair of first shaft parts 421, 422, the frame body part 43, the pair of second shaft parts 441, 442, and the permanent magnet 46.

It is preferable that the frequency of the second voltage V2 is smaller than the frequency of the first voltage V1. Thereby, the movable part 41 may be swung at the frequency of the first voltage V1 around the first axis J1 while being swung at the frequency of the second voltage V2 around the second axis J2 more reliably and more smoothly.

Further, suppose that the torsional resonance frequency of the first vibration system is f1 [Hz] and the torsional resonance frequency of the second vibration system is f2 [Hz], f1 and f2 preferably satisfy a relationship of f2<f1 and more preferably satisfy a relationship of 10f2≤f1. Thereby, the movable part 41 may be swung at the frequency of the first voltage V1 around the first axis J1 while being swung at the frequency of the second voltage V2 around the second axis J2 more smoothly. On the other hand, if f1≤f2, the vibration of the first vibration system at the frequency of the second voltage V2 may be generated.

The first voltage generation part 491 and the second voltage generation part 492 are respectively connected to the control unit 6, and driven based on the signals from the control unit 6. The voltage superimposition part 493 is connected to the first voltage generation part 491 and the second voltage generation part 492.

The voltage superimposition part 493 includes an adder 493a for application of a voltage to the coil 47. The adder 493a receives the first voltage V1 from the first voltage generation part 491 and the second voltage V2 from the second voltage generation part 492, and superimposes these voltages and applies it to the coil 47.

Next, a method of driving the light scanner 4 will be explained. The frequency of the first voltage V1 is set to be equal to the torsional resonance frequency of the first vibration system and the frequency of the second voltage V2 is set to take a value different from that of the torsional resonance frequency of the second vibration system and smaller than the frequency of the first voltage V1 (for example, the frequency of the first voltage V1 is set to 18 kHz and the frequency of the second voltage V2 is set to 60 kHz).

For example, the first voltage V1 shown in FIG. 5A and the second voltage V2 shown in FIG. 5B are superimposed by the voltage superimposition part 493 and the superimposed voltage is applied to the coil 47. Then, the magnetic field that attracts one end (N-pole) of the permanent magnet 46 to the coil 47 and separates the other end (S-pole) of the permanent magnet 46 from the coil 47 (this magnetic field is referred to as "magnetic field A1") and the magnetic field that separates the one end (N-pole) of the permanent magnet 46 from the coil 47 and attracts the other end (S-pole) of the permanent magnet 46 to the coil 47 (this magnetic field is referred to as "magnetic field A2") are alternately switched by the first voltage V1.

The magnetic field A1 and the magnetic field A2 are alternately switched in this manner, and thereby, a vibration having a torsional vibration component around the first axis J1 is excited in the frame body part 43 and the movable part 41 swings around the first axis J1 at the frequency of the first voltage V1 while the first shaft parts 421, 422 are torsionally deformed with the vibration. Note that, since the frequency of the first voltage V1 is equal to the torsional resonance frequency of the first vibration system, the movable part 41 may be largely swung.

On the other hand, the magnetic field that attracts the one end (N-pole) of the permanent magnet 46 to the coil 47 and separates the other end (S-pole) of the permanent magnet 46 from the coil 47 (this magnetic field is referred to as "magnetic field B1") and the magnetic field that separates the one end (N-pole) of the permanent magnet 46 from the coil 47 and attracts the other end (S-pole) of the permanent magnet 46 to the coil 47 (this magnetic field is referred to as "magnetic field B2") are alternately switched by the second voltage V2.

The magnetic field B1 and the magnetic field B2 are alternately switched in this manner, and thereby, the frame body part 43 swings with the movable part 41 around the second axis J2 at the frequency of the second voltage V2 while the second shaft parts 441, 442 are torsionally deformed. Note that, as described above, since the frequency of the second voltage V2 is set to be extremely lower than the frequency of the first voltage V1 and the torsional resonance frequency of the second vibration system is designed to be lower than the torsional resonance frequency of the first vibration system, the movable part 41 may be prevented from rotating around the first axis J1 at the frequency of the second voltage V2.

As described above, in the light scanner 4, the voltage formed by superimposing the first voltage V1 and the second voltage V2 is applied to the coil 47, and thereby, the movable part 41 may be rotated around the first axis J1 at the frequency of the first voltage V1 while being rotated around the second axis J2 at the frequency of the second voltage V2. Thereby, reduction in cost and size of the apparatus may be realized. Further, by employing the electromagnetic drive system (moving magnet system), reliably, the movable part 41 may be swung around the respective first, second axes J1, J2 and two-dimensional scanning with the drawing laser beam LL reflected by the first light reflection reduction part 413 may be performed. Further, the number of components (permanent magnets and coils) forming the drive source may be reduced and a simple and compact configuration may be provided. Furthermore, the coil 47 is apart from the vibration systems of the light scanner 4, and thus, an adverse effect on the vibration systems due to heat generation of the coil 47 may be prevented.

As above, the light scanner 4 has been explained in detail. According to the two-dimensional light scanner 4 having a gimbal structure in the embodiment, two-dimensional scanning may be performed with the drawing laser beam LL by one apparatus, and the apparatus may be made smaller and alignment adjustment may be easier compared to a configuration for two-dimensional scanning with the drawing laser beam LL by a combination of two one-dimensional light scanners.

Control Unit

The control unit 6 has a function of controlling the operations of the drawing light source unit 2 and the light scanner 4. Specifically, the control unit 6 drives the light scanner 4 to swing the movable part 41 around the first, second axes J1, J2 and outputs the drawing laser beam LL from the drawing light source unit 2 in synchronization with the swing of the movable part 41. The control unit 6 outputs laser beams RR, GG, BB with predetermined intensity from the respective laser sources 21R, 21G, 21B and outputs the drawing laser beam LL with predetermined color and intensity (brightness) at a predetermined time based on image data transmitted from an external computer, for example. Thereby, an image in response to the image data is displayed on the object 10.

As above, the configuration of the image display device 1 has been explained in detail. According to the image display device 1, the object 10 is scanned with part of the drawing laser beam LL by the light scanner 4, and thereby, the brightness (intensity) of the drawing laser beam LL may be suppressed. Accordingly, contrast of the image displayed on the object 10 may be improved. As described above, in the image display device 1, it is unnecessary to suppress the output of the respective laser sources 21R, 21G, 21B in order to suppress the brightness (intensity) of the drawing laser beam LL for scanning of the object 10, and thus, the laser beams RR, GG, BB may be stably output from the respective laser sources 21R, 21G, 21B and the better image display characteristics may be provided.

Further, the drawing laser beam LL that has not been reflected by the light reflection surface 413a of the light scanner 4 passes through the light transmission part 412, and absorption of the drawing laser beam LL in the light transmission part 412 is suppressed (prevented) because the light transmission part 412 has high light transmissivity. Accordingly, the heat generation of the movable part 41 is suppressed and reduction (change) in the vibration characteristics of the light scanner 4 due to thermal stress may be effectively suppressed. Furthermore, the anti-reflection film 5 and the second light reflection reduction part 7 are provided in the light scanner 4, and thus, the drawing laser beam LL that has not been reflected by the light reflection surface 413a of the light scanner 4 may be prevented from being stray light.

Note that there is a problem that, to suppress the brightness of the drawing laser beam LL by suppressing the output of the respective laser sources 21R, 21G, 21B as in related art, it may be impossible to make the brightness of the drawing laser beam LL is sufficiently lower, driving of the respective laser sources 21R, 21G, 21B may be unstable, and stable output of the laser beams RR, GG, BB may be impossible.

Second Embodiment

Next, the second embodiment of the image display device according to the invention will be explained.

Figure 6:
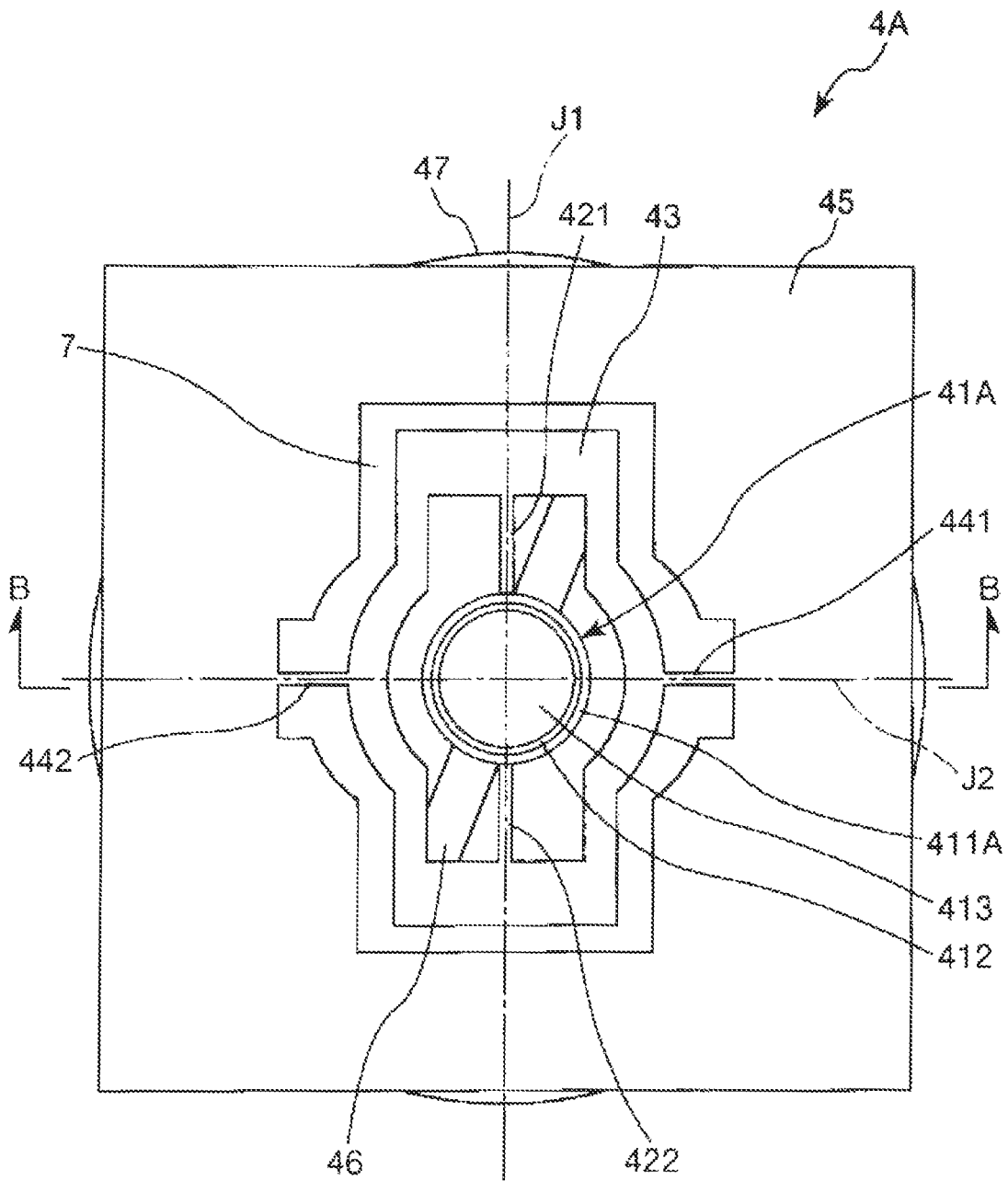
FIG. 6 is a top view of a light scanner of an image display device according to a second embodiment of the invention.
Figure 7:
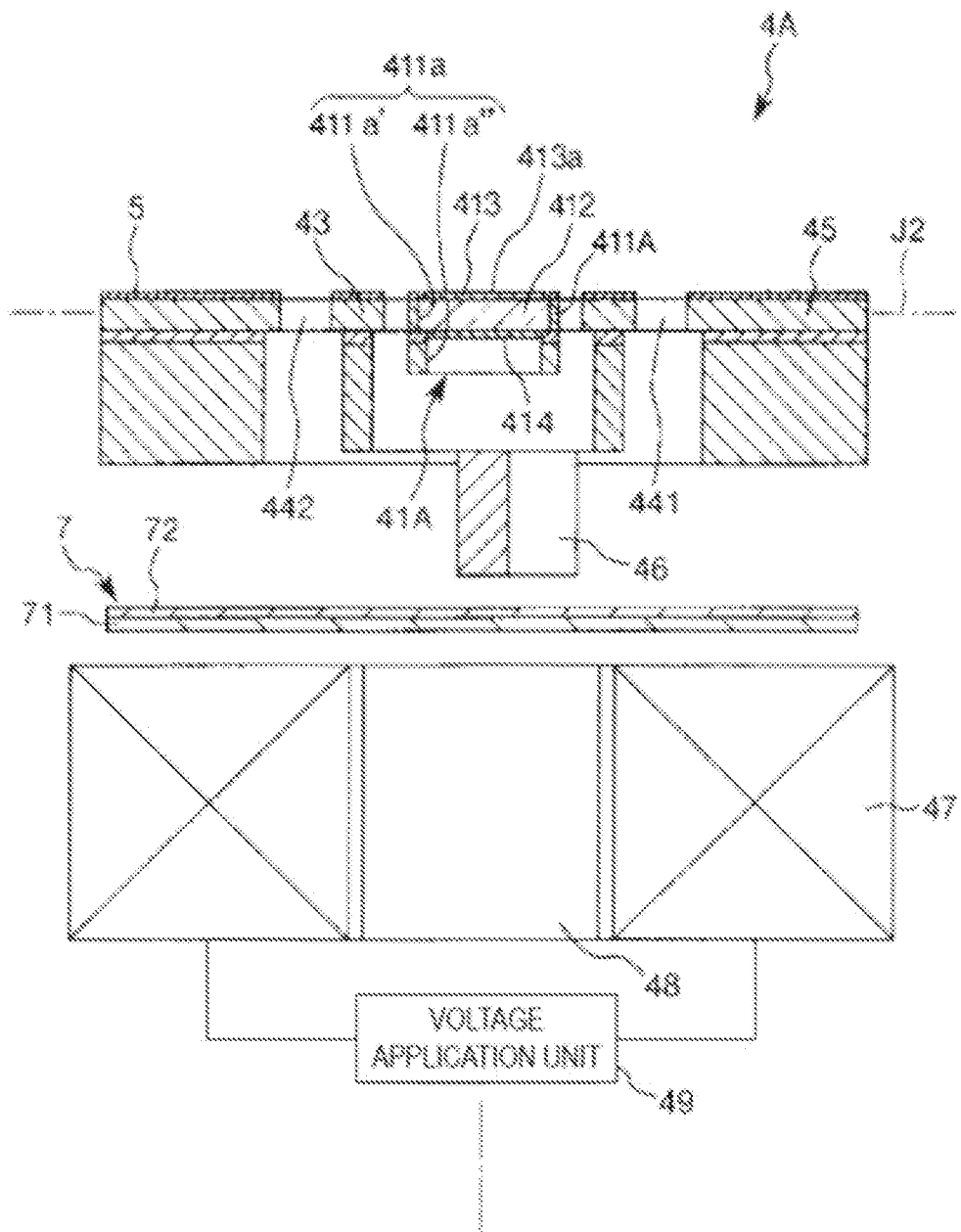
FIG. 7 is a sectional view along B-B line in FIG. 6.

FIG. 6 is a top view of a light scanner of the image display device according to the second embodiment according to the invention, and FIG. 7 is a sectional view along B-B line in FIG. 6.

As below, regarding the image display device of the second embodiment, the difference from the above described embodiment will be centered for explanation and the explanation of the same items will be omitted.

The image display device according to the second embodiment according to the invention is the same as the above described first embodiment except the difference in the configuration of the movable part of the light scanner. Note that the same configurations as those of the above described first embodiment have the same signs.

Light Scanner

As shown in FIGS. 6, 7, a movable part 41A of a light scanner 4A of the embodiment has a base part 411A, a light transmission part 412 fitted in the base part 411A, and first, third light reflection reduction parts 413, 414 provided on the light transmission part 412.

The base part 411A has an annular shape and a through hole 411a is formed at the center. A step is formed in the middle of the through hole 411a in the axial direction. Specifically, the through hole 411a has a first through hole 411a' and a second through hole 411a" connected to the downside of the first through hole 411a', and the second through hole 411a" is coaxially provided with the first through hole 411a' and has the smaller diameter than that of the first through hole 411a'. The step is formed in a connection part of the first through hole 411a' and the second through hole 411a".

The light transmission part 412 is fitted in the first through hole 411a' of the base part 411A, and the lower surface of the light transmission part 412 is in contact with the step portion. As described above, the light transmission part 412 is provided within the through hole 411a, and thereby, the height may be suppressed compared to that of the light scanner 4 of the first embodiment, for example, and reduction in size (height) of the light scanner 4A may be realized. Further, the step functions as a stopper (positioning unit) when the light transmission part 412 is fitted in the first through hole 411a', and thus, placement of the light transmission part 412 may be accurately controlled.

Furthermore, the base part 411A is formed by a multilayered structure including a first Si layer, an $SiO_2$ layer, and a second Si layer of an SOI substrate like the frame body part 43 and the support part 45. Thereby, the stiffness of the base part 411A may be made better. For example, the first through hole 411a' is formed using the first Si layer and the second through hole 411a" is formed using the $SiO_2$ layer and the second Si layer, and thereby, the through hole 411a with the step may be easily formed.

According to the second embodiment, the same advantage as that of the above described first embodiment may be provided.

Third Embodiment

Next, the third embodiment of the image display device according to the invention will be explained.

Figure 8:
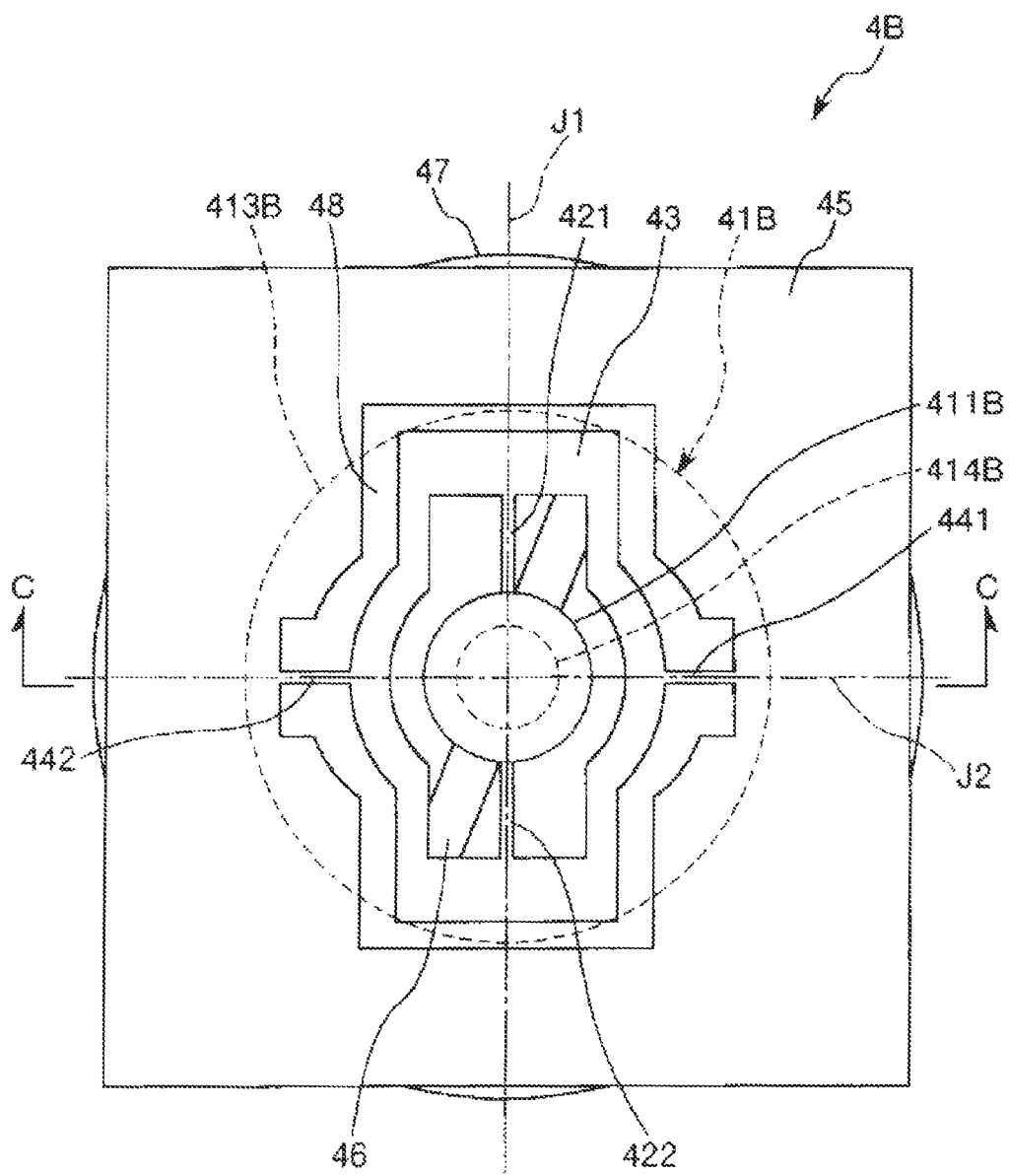
FIG. 8 is a top view of a light scanner of an image display device according to a third embodiment of the invention.
Figure 9:
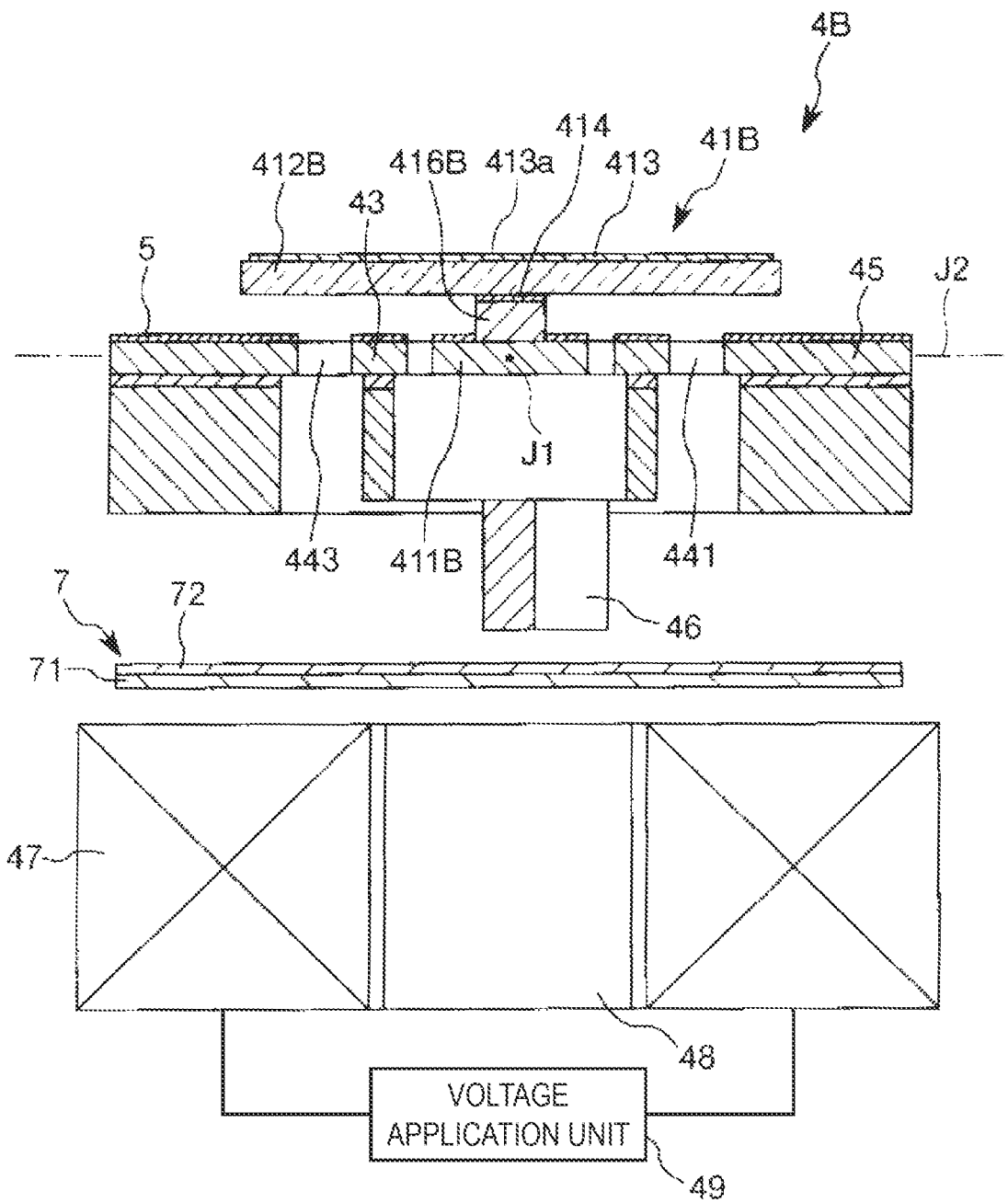
FIG. 9 is a sectional view along C-C line in FIG. 8.

FIG. 8 is a top view of a light scanner of the image display device according to the third embodiment according to the invention, and FIG. 9 is a sectional view along C-C line in FIG. 8.

As below, regarding the image display device of the third embodiment, the difference from the above described embodiments will be centered for explanation and the explanation of the same items will be omitted.

The image display device according to the third embodiment according to the invention is the same as the above described first embodiment except the difference in the configuration of the movable part of the light scanner. Note that the same configurations as those of the above described first embodiment have the same signs.

Light Scanner

As shown in FIGS. 8, 9, a movable part 41B of a light scanner 4B of the embodiment has a base part 411B, a plate-like light transmission part 412B fixed to the base part 411B via a spacer 416B, a first light reflection reduction part 413 formed on the upper surface of the light transmission part 412B, and a third light reflection reduction part 414 formed on the lower surface of the light transmission part 412B.

The first light reflection reduction part 413 is provided to be apart from the first shaft parts 421, 422 in the plate thickness direction of the light transmission part 412B and overlap with the first shaft parts 421, 422 in the plan view. Accordingly, the area of the plate surface of the light transmission part 412B (the area of the first light reflection reduction part 413) may be made larger while the distance between the first shaft parts 421, 422 may be made shorter. Further, the distance between the first shaft parts 421, 422 may be made shorter, and thus, downsizing of the frame body part 43 may be realized. Furthermore, downsizing of the frame body part 43 may be realized, and thus, the distance between the second shaft parts 441, 442 may be made shorter. According to the configuration, even when the area of the plate surface of the light transmission part 412B (the area of the first light reflection reduction part 413) is made larger, downsizing of the light scanner 4B may be realized.

In the light scanner 4B, in the plan view, the anti-reflection film 5 is provided in a region located at the underside and the outside of the light reflection surface 413a, specifically, on the upper surfaces of the base part 411B, the first shaft parts 421, 422, the frame body part 43, the second shaft parts 441, 442, and the support part 45. Thereby, the drawing laser beam LL radiated on other parts than the first light reflection reduction part 413 may be prevented from being stray light. Note that the anti-reflection film 5 may be provided on the side surfaces of the spacer 414B, the base part 411B, the frame body part 43, and the support parts 45, for example. Thereby, the above described advantage may be further improved.

According to the third embodiment, the same advantage as that of the above described first embodiment may be provided.

2. Method of Manufacturing Light Scanner

Next, a method of manufacturing the light scanner will be explained with reference to FIGS. 10A to 13C. Note that, in the method of manufacturing the light scanner as below, the light scanner having the similar configuration to that of the above described third embodiment is obtained.

The method of manufacturing the light scanner has a bonding step of preparing a multilayered substrate (substrate) 8 having a second Si layer 84 (base part) and a spacer 914 (projection part) and a glass substrate (transparent substrate) 3 with a convex portion 31 formed on one surface side, superposing the multilayered substrate 8 and the glass substrate 3, and bonding the spacer 914 and the convex portion 31, a patterning step of patterning the second Si layer 84 and forming a base part 911 that supports the spacer 914, first shaft parts 921, 922, a frame body part 93, second shaft parts 941, 942, and a support part 95, a filling step of filling a gap between the multilayered substrate 8 and the glass substrate 3 with a sealing material 100, a thinning step of thinning the glass substrate 3 while leaving the convex portion 31 to form a light transmission part 912, and a first light reflection reduction part forming step of forming the first light reflection reduction part 413 that reduces light reflection on a surface of the light transmission part 912. As below, the manufacturing method will be explained in detail.

[1] Bonding Step

[1-1] Multilayered Substrate Processing Step

Figure 10A:
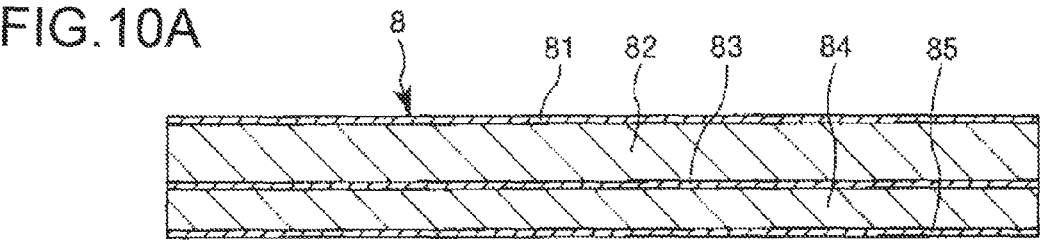
FIGS. 10A to 10D are sectional views for explanation of a method of manufacturing the light scanner according to the invention.

First, as shown in FIG. 10A, the multilayered substrate 8 in which a first $SiO_2$ layer 81, a first Si layer 82, a second $SiO_2$ layer 83, the second Si layer 84, and a third $SiO_2$ layer 85 are stacked from the upside is prepared. The thicknesses of the respective layers are not particularly limited, but, for example, the first $SiO_2$ layer 81 may be about 1.6 μm, the first Si layer 82 may be about 250 μm, the second $SiO_2$ layer 83 may be about 0.5 μm, the second Si layer 84 may be about 40 μm, and the third $SiO_2$ layer 85 may be about 0.5 μm.

Figure 10B:
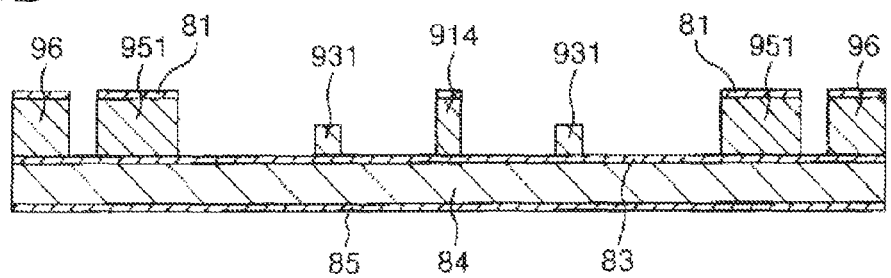
Figure 10C:
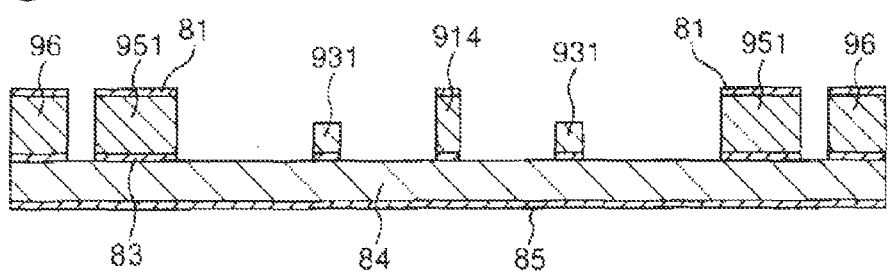

Then, as shown in FIG. 10B, the spacer (columnar support) 914, rib portions 931 of the frame body part 93, rib portions 951 of the support part 95, and a part of a frame part 96 surrounding the outer circumference of the support part 95 are formed by dry etching (two-step dry etching), for example. Specifically, first, an $SiO_2$ mask formed by patterning of the first $SiO_2$ layer 81 is provided in positions corresponding to the spacer (columnar support) 914, the rib portions 951 of the support part 95, and the frame part 96, and a resist mask is provided in positions corresponding to the rib portions 931 of the frame body part 93. Then, the first-step dry etching is performed, the resist mask is removed, and then, the second-step dry etching is performed. Then, as shown in FIG. 10C, the first $SiO_2$ layer 81 and the second $SiO_2$ layer 83 exposed from the first Si layer 82 are removed by wet etching, for example.

Figure 10D:
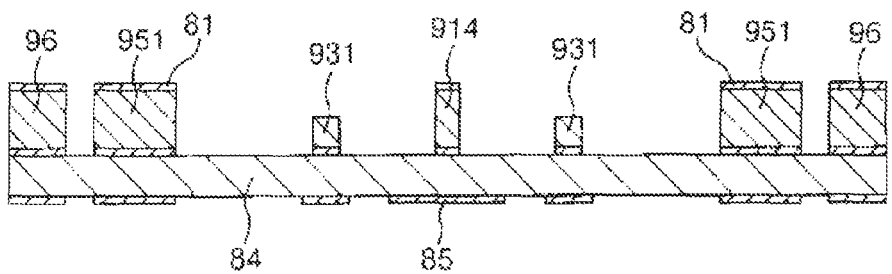

Then, as shown in FIG. 10D, the third $SiO_2$ layer 85 is patterned by dry etching, for example, and the third $SiO_2$ layer 85 having a shape corresponding to the shapes in the plan view of the base part 911, the first shaft parts 921, 922, the frame body part 93, the second shaft parts 941, 942, and the support part 95 is obtained.

[1-2] Glass Substrate Processing Step

Figure 11A:
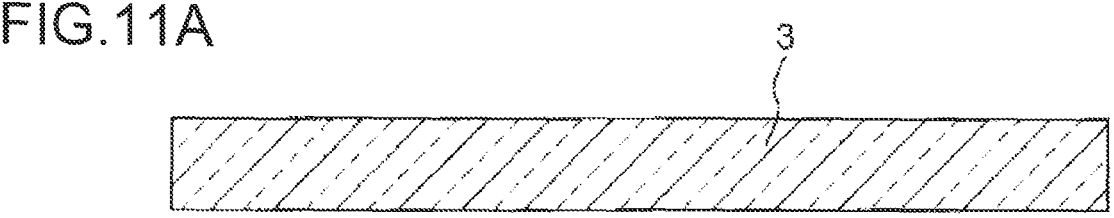
FIGS. 11A and 11B are sectional views for explanation of the method of manufacturing the light scanner according to the invention.
Figure 11B:
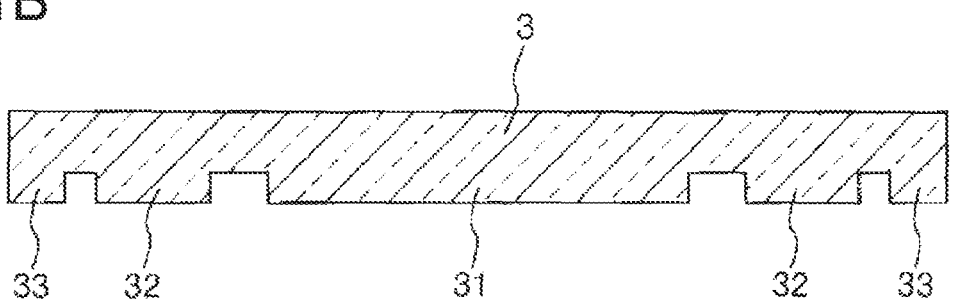

First, as shown in FIG. 11A, the substantially colorless and transparent glass substrate (e.g., TEMPAX glass substrate) 3 is prepared. The thickness of the glass substrate 3 is not particularly limited, but may be set to about 400 μm, for example. Then, as shown in FIG. 11B, the upper surface of the glass substrate 3 is patterned by wet etching, for example, and thereby, the convex portion 31 corresponding to the shape in the plan view of the light transmission part 912, convex portions 32 corresponding to the shape in the plan view of the support part 95, and convex portions 33 for bonding to the frame part 96 are formed. The heights of the convex portions 31 to 33 are not particularly limited, but may be respectively set to about 80 μm, for example.

Note that, then, as necessary, an anti-reflection film may be deposited on the upper surface of the convex portion 31. By deposition of the anti-reflection film, the light scanner in which the anti-reflection film is formed on the lower surface of the light transmission part 912 is obtained.

[1-3] Bonding Step

Figure 12A:
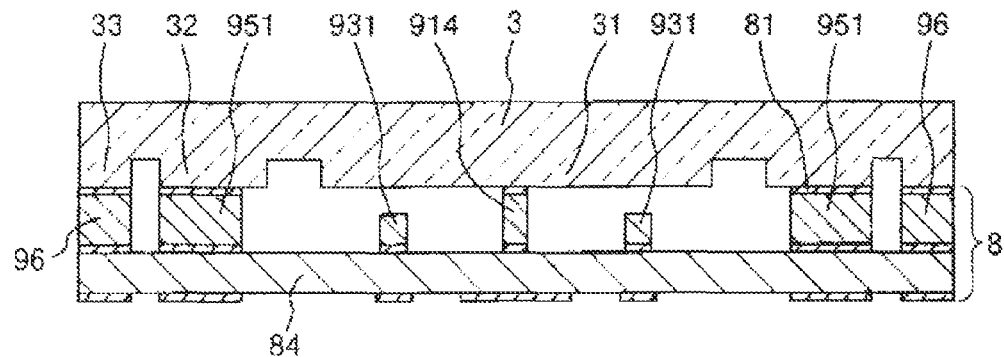
FIGS. 12A to 12C are sectional views for explanation of the method of manufacturing the light scanner according to the invention.

First, as shown in FIG. 12A, the multilayered substrate 8 obtained at the step [1-1] and the glass substrate 3 obtained at the step [1-2] are bonded with the convex portion 31 facing the spacer 914, the convex portion 32 facing the rib portion 951 and the convex portions 33 facing the frame parts 96. Note that a bonding method is not particularly limited, but anodic bonding is preferably used. Thereby, the multilayered substrate 8 and the glass substrate 3 may be reliably and strongly bonded.

[2] Patterning Step (Silicon Etching Step)

Figure 12B:
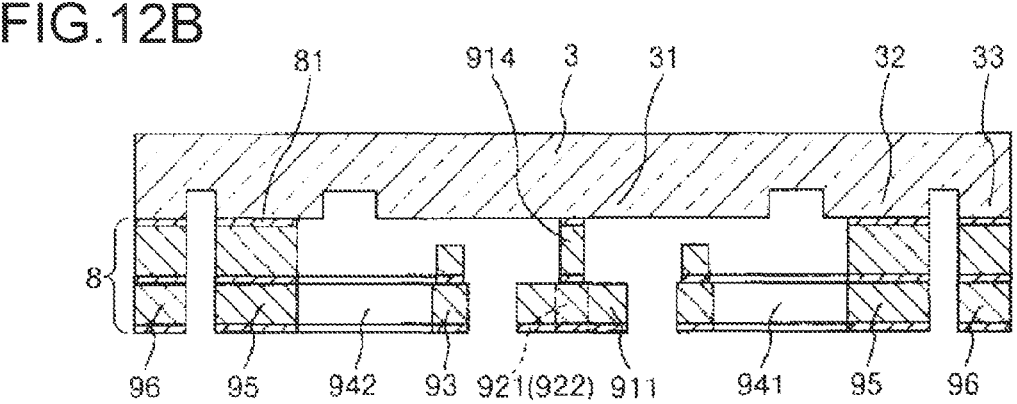

Then, as shown in FIG. 12B, the second Si layer 84 is etched by dry etching, for example, and thereby, the base part 911, the first shaft parts 921, 922, the frame body part 93, the second shaft parts 941, 942, and the support part 95 are obtained.

[3] Filling Step

Figure 12C:
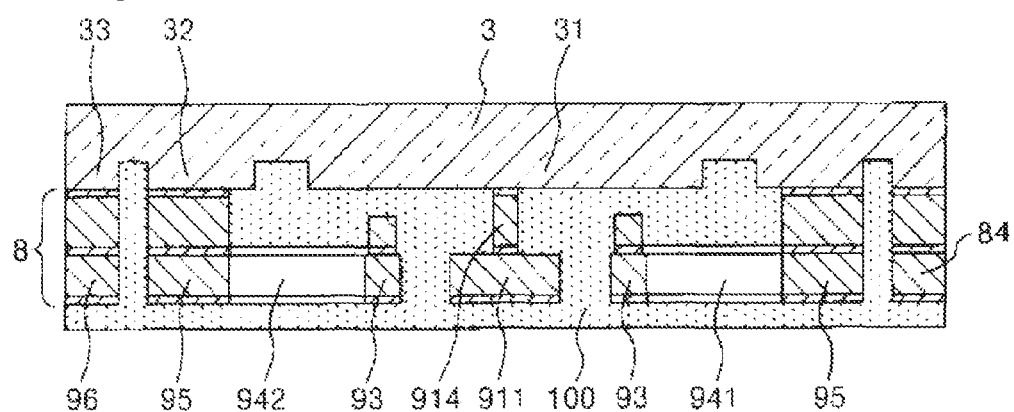

Then, as shown in FIG. 12C, the sealing material 100 such as wax is supplied from the gap formed in the second Si layer 84, and the gap between the glass substrate 3 and the multilayered substrate 8 is filled with the sealing material 100.

[4] Thinning Step

Figure 13A:
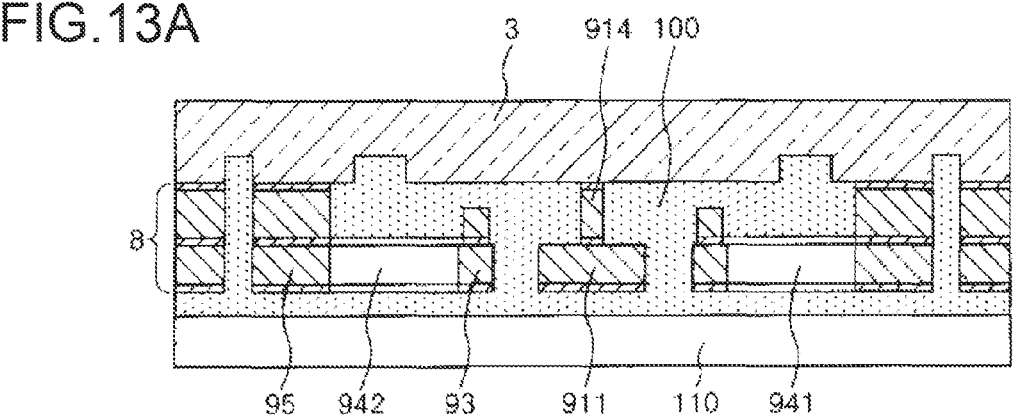
FIGS. 13A to 13C are sectional views for explanation of the method of manufacturing the light scanner according to the invention.
Figure 13B:
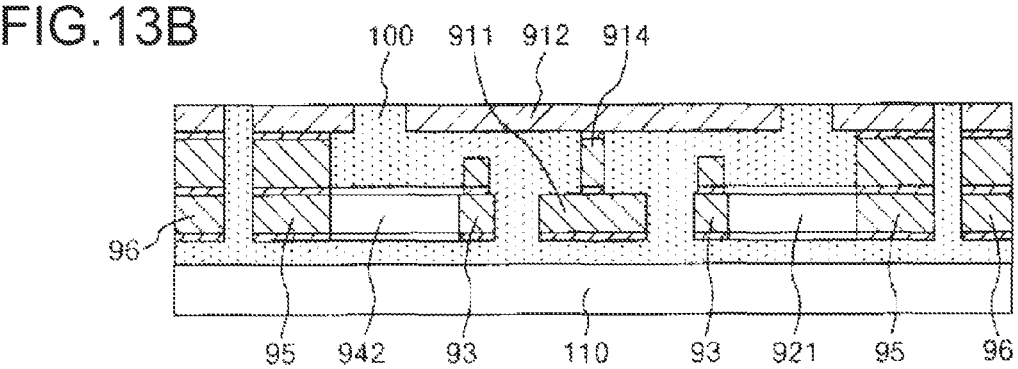

Then, as shown in FIG. 13A, the multilayered substrate 8 is directed downward and the multilayered structure of the glass substrate 3 and the multilayered substrate 8 is fixed to a support substrate 110. For the fixation, the sealing material 100 is used. Then, as shown in FIG. 13B, the glass substrate 3 is etched to be thinner by wet etching, for example. Thereby, the other parts than the convex portions 31 to 33 are removed, the convex portions 31 to 33 respectively become independent, and the light transmission part 912, the frame body part 93, and the support part 95 are obtained. Further, the heights of the convex portions 31 to 33 are adjusted. Here, the multilayered substrate 8 is protected by the sealing material 100, and thus, the etchant is not brought into contact with the multilayered substrate 8 and damage on the multilayered substrate 8 may be prevented at the step.

Note that the processing method of the glass substrate 3 is not limited to wet etching, but may be polishing processing, for example. In the case of polishing processing, breakage of the structure at polishing may be resolved by protection with the sealing material 100.

[5] Light Reflection Layer Forming Step

Figure 13C:
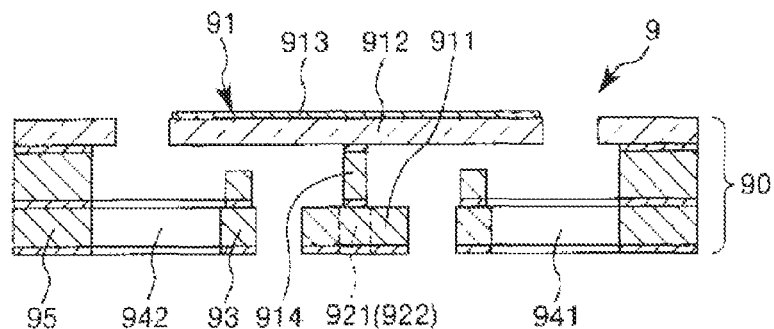

Then, the sealing material 100 is removed using a solvent such as acetone, and then, from the frame parts 96, their inside parts are cut out by dicing or the like. Then, for example, an anti-reflection film is deposited on the upper surface of the light transmission part 912, and thereby, a light reflection layer 913 is formed. In this manner, as shown in FIG. 13C, a light scanner 9 (structure 90) is obtained.

According to the method of manufacturing the light scanner, the light scanner having the light transmission part may be manufactured easily and accurately.

Head-Up Display

Next, a head-up display as an example of the image display device according to the invention will be explained.

Figure 14:
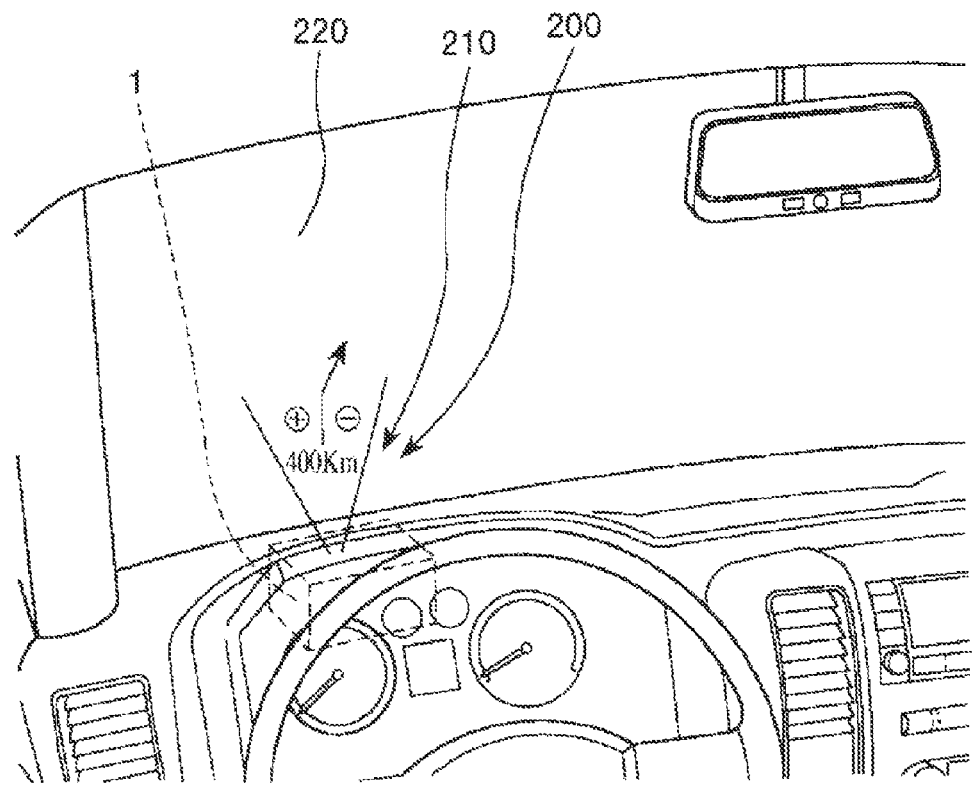
FIG. 14 is a perspective view showing a head-up display that applies the image display device according to the invention.

FIG. 14 is a perspective view showing a head-up display that applies the image display device according to the invention.

As shown in FIG. 14, in a head-up display system 200, the image display device 1 is mounted on a dashboard of an automobile to form a head-up display 210. By the head-up display 210, for example, a predetermined image such as guidance display to a destination may be displayed on a front glass 220. Note that the head-up display system 200 may be applied not only to the automobile but also to aircrafts, boats and ships, etc.

Head-Mounted Display

Next, a head-mounted display according to the invention will be explained.

Figure 15:
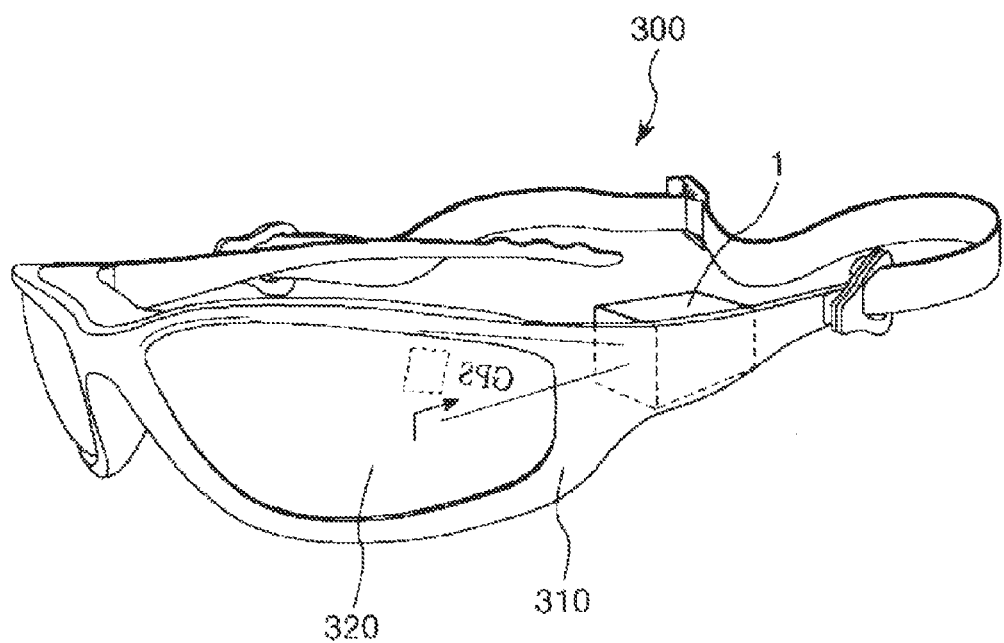
FIG. 15 is a perspective view showing a head-mounted display according to the invention.

FIG. 15 is a perspective view showing a head-mounted display according to the invention.

As shown in FIG. 15, a head-mounted display 300 has a frame 310 worn on the head of an observer, and the image display device 1 mounted on the frame 310. Further, by the image display device 1, a predetermined image that is visually recognized by one eye is displayed on a display part (light reflection layer member) 320 provided in a location of the frame 310 where a lens is supposed to be provided.

The display part 320 may be transparent or opaque. In the case where the display part 320 is transparent, information from the image display device 1 may be superimposed on information from the real world for use. Further, it is only necessary that the display part 320 reflects at least a part of incident light and, for example, a half mirror may be used.

Note that two image display devices 1 may be provided in the head-mounted display 300 and images to be visually recognized by both eyes may be displayed on two display parts.

As above, the light scanner, the image display device, the head-mounted display, and the method of manufacturing the light scanner according to the invention have been explained with reference to the illustrated embodiments, however, the invention is not limited to those, but the configurations of the respective parts may be replaced by arbitrary configurations having the same functions. Further, another arbitrary configuration may be added to the invention.

Furthermore, in the above described embodiments, one light scanner that can perform two-dimensional scanning with the drawing laser beam is used, however, two light scanners (the light scanners according to the invention) that can perform one-dimensional scanning may be prepared and they may be placed so that their swing axes may be orthogonal to each other. According to the configuration, two-dimensional scanning with the drawing laser beam may be performed.

In addition, in the above described embodiments, the drive system of the light scanner is the electromagnetic drive system using coils and permanent magnets, however, the drive system is not limited to that, but, for example, a piezoelectric drive system that drives the light scanner using contraction and expansion of piezoelectric elements provided on the respective first and second shaft parts or an electrostatic drive system using electrostatic force may be employed. Further, in the case of using the electromagnetic drive system, arrangement of coils and permanent magnets may be reversed. That is, the coil may be provided in the frame body part and the permanent magnet may be provided to face the coil.

The entire disclosure of Japanese Patent Application No. 2013-020165, filed Feb. 5, 2013 is expressly incorporated by reference herein.

What is claimed is:

1. A light scanner comprising:
    a base part;
    a shaft part that swingably supports the base part around a first axis;
    an optical unit including a light transmission part that is supported by the base part and has light transmissivity, and a first light reflection reduction part that is provided on the light transmission part and reduces light reflection,
    wherein light enters the first light reflection reduction part.

2. The light scanner according to claim 1, wherein light reflectance of the optical unit is less than 4%.

3. The light scanner according to claim 1, wherein light transmittance of the optical unit is 92% or more.

4. The light scanner according to claim 1, wherein a second light reflection reduction part that reduces reflectance of the light transmitted through the first light reflection reduction part and the light transmission part is provided at an opposite side of the light transmission part to a surface on which the first light reflection reduction part is provided.

5. The light scanner according to claim 1, wherein the optical unit is provided on a surface at the opposite side of the light transmission part to the surface on which the first light reflection reduction part is provided, and includes a third light reflection reduction part that reduces light reflection.

6. The light scanner according to claim 1, wherein the base part has a through hole, and at least part of the light transmitted through the optical unit passes through the through hole.

7. The light scanner according to claim 6, wherein the light transmission part is provided to cover an opening at one side of the through hole.

8. The light scanner according to claim 6, wherein the light transmission part is provided within the through hole.

9. The light scanner according to claim 8, wherein a step portion is formed in the middle of the through hole in an axial direction, and
the light transmission part is in contact with the step portion.

10. The light scanner according to claim 1, wherein the light transmission part is provided to be apart from the shaft part in a thickness direction of the first light reflection reduction part and overlap with at least a part of the shaft part as seen from the thickness direction.

11. An image display device comprising:
a light source; and
the light scanner according to claim 1.

12. A head-mounted display comprising:
a frame worn on a head of an observer; and
the light scanner according to claim 1.

13. A method of manufacturing a light scanner comprising:
bonding substrates by preparing a substrate having a plate-like base part and a projection part projecting to one surface side of the base part and a transparent substrate with a convex portion formed on one surface side, superposing the substrate and the transparent substrate, and bonding the projection part and the convex portion;
patterning the base part and forming the base part that supports the projection part and a shaft part connected to the base part;
thinning the transparent substrate while leaving the convex portion to form a light transmission part; and
forming a light reflection reduction part that reduces light reflection in the light transmission part.

14. The method of manufacturing a light scanner according to claim 13 further comprising a filling step of filling a gap between the substrate and the transparent substrate with a sealing material prior to the thinning of the transparent substrate,
wherein thinning of the transparent substrate is performed by wet etching at the thinning of the transparent substrate.

15. A light scanner comprising:
a base part;
a shaft part that swingably supports the base part around a first axis; and
an optical unit including a first optical part that is supported by the base part and has light transmissivity, and a second optical part that is provided on the first optical part and has higher light transmittance than the light transmittance of the first optical part,
wherein light enters the second optical part.

* * * * *